United States Patent

[11] 3,612,916

[72] Inventor Daniel R. O'Neill
28019 Hazelridge Drive, Palos Verdes Peninsula, Calif. 90274

[21] Appl. No. 59,070
[22] Filed July 29, 1970
[45] Patented Oct. 12, 1971

[54] DIFFERENTIAL PHASE SHIFTER
10 Claims, 8 Drawing Figs.

[52] U.S. Cl. .......... 307/295, 307/232, 307/262, 323/119, 324/83 A, 324/83 Q, 328/105, 328/155
[51] Int. Cl. .......... H03k 1/16
[50] Field of Search .......... 328/55, 133, 143, 105, 155; 307/232, 262, 271, 295; 324/83 A, 83 Q; 323/119; 332/22, 23 A, 23 R

[56] References Cited

UNITED STATES PATENTS 3,191,130 6/1965 Rudd, Jr. et al. .......... 328/155 X
3,444,396 5/1969 Fox .......... 328/55 X
3,445,685 5/1969 Roth .......... 307/295
3,500,217 3/1970 Allen .......... 328/133 X

*Primary Examiner*—Stanley T. Krawczewicz
*Attorney*—Fraser and Bogucki

ABSTRACT: A differential phase shifter comprises four phase shift networks connected in parallel to a single input. Each phase shift network includes five series connected phase shift circuits comprising a bipolar transistor with a resistor and capacitor connected in series between the collector and emitter. The transistor base provides a high impedance input and the common junction between the resistor and capacitor provides an output of each phase shift circuit. Different pairs of phase shift networks are connected to each of two summing amplifiers which provide the differential outputs. When the components of each phase shift circuit are chosen to form a proper relationship the differential phase shift between the two outputs is maintained very nearly constant over a very broad frequency range.

INVENTOR.
DANIEL R. O'NEILL
BY
Fraser & Bogucki
ATTORNEYS

INVENTOR.
DANIEL R. O'NEILL
BY
*Fraser & Bogucki*
ATTORNEYS

INVENTOR.
DANIEL R. O'NEILL
BY
Fraser & Bogucki
ATTORNEYS

DIFFERENTIAL PHASE SHIFTER

BACKGROUND OF THE INVENTION

1. Field of the Invention

This invention relates to a circuit providing a constant differential phase shift over a broad frequency range.

2. Prior Art

Presently known differential phase shifters use a variety of all pass networks. One commonly used arrangement comprises a lattice network of inductors and capacitors.

It has been found, however, that the best results attainable with such an arrangement is a phase differential varying by ±5° over a frequency range of 350:1 covering several thousand Hertz. While this may be satisfactory performance for some requirements, it is not satisfactory for others, such as a wide band application of single side band frequency modulation.

The bipolar transistor version of the phase shift circuit which forms the basic building block of this invention has also been suggested by the prior art. This version connects a resistor and a capacitor in series between the collector and emitter of a transistor, the input being the transistor base and the output being the junction of the resistor and capacitor. This arrangement produces a phase shift in accordance with the formula $\Phi = 2 \arctan 2\pi fRC$, where: $\Phi$ = phase shift, f = frequency, R = resistance and C = capacitance.

SUMMARY OF THE INVENTION

A differential phase shifter is provided having two pairs of phase shift networks. The individual outputs of each pair are added together in separate summing amplifiers, the outputs of the summing amplifiers having a differential phase shift which is relatively constant over an extremely broad frequency range.

The uniformity of the differential phase shift has been found to depend upon the relationship between the phase shift circuits which are cascaded into a single phase shift network as well as the relationships between corresponding phase shift circuits of different networks. However, by properly identifying and establishing these relationships a differential phase shift of 90°, $$\begin{matrix} +0.3° \\ -1.5°, \end{matrix}$$

has been obtained over a very broad frequency range of 40 Hz. to 2 MHz.

BRIEF DESCRIPTION OF THE DRAWINGS

A better understanding of the invention may be had from the following detailed description, taken in conjunction with the accompanying drawings, in which.

DETAILED DESCRIPTION

A differential phase shifter in accordance with the present invention operates in response to a single input to provide two outputs having a relative phase differential which remains nearly constant over a broad frequency range.

Figure 1:
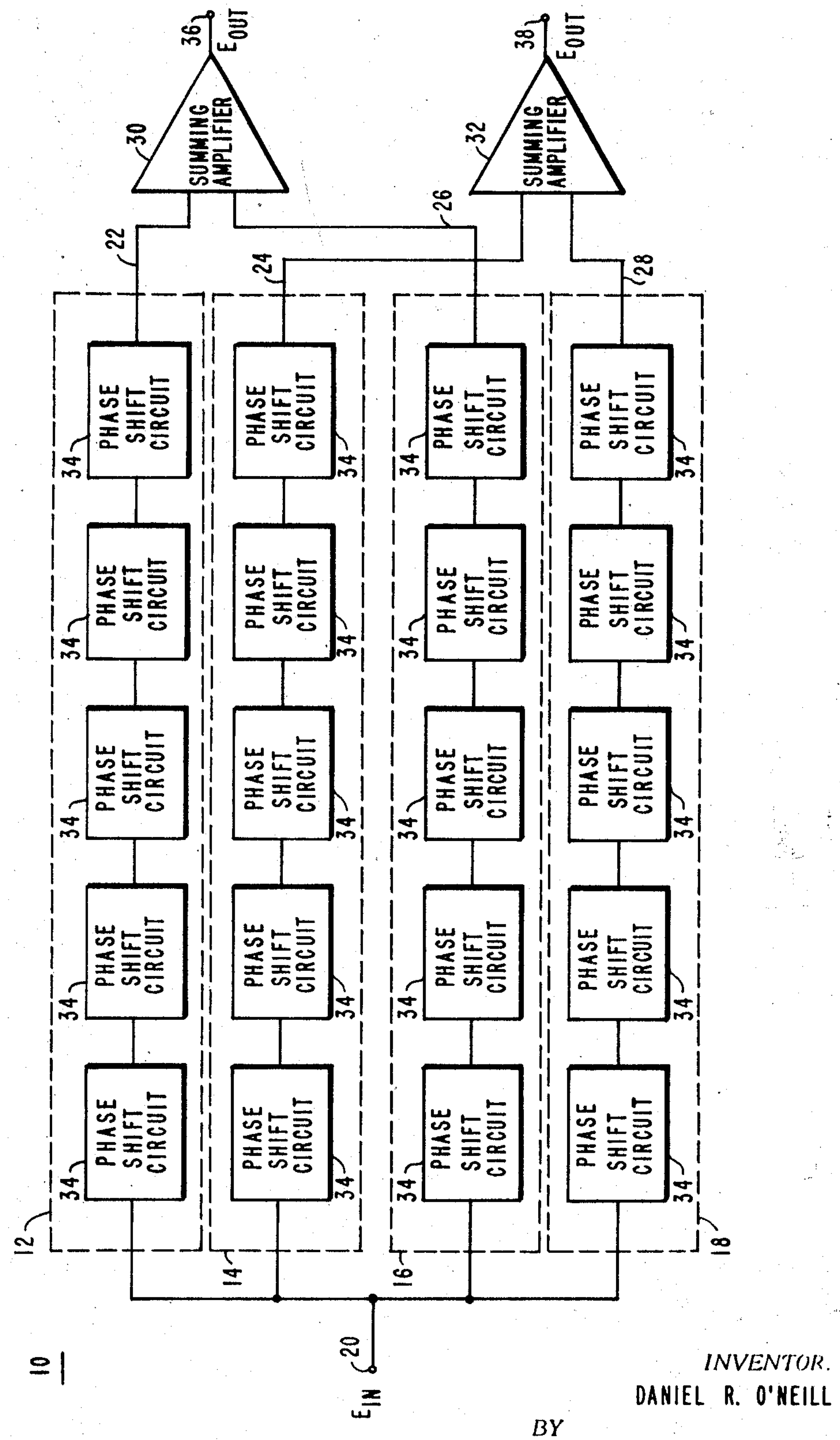
FIG. 1 is a block diagram and schematic drawing of a phase shifter in accordance with the invention.

As shown in FIG. 1, a differential phase shifter 10 comprises phase shift networks 12, 14, 16, 18 connected in parallel to a single input 20. The outputs 22, 26 of the phase shift networks 12, 16 respectively are coupled to a summing amplifier 30 and the outputs 24, 28 of the phase shift networks 14, 18 respectively are coupled to a summing amplifier 32. Each phase shift network 12, 14, 16, 18 comprises five phase shift circuits 34 connected in series. All of the phase shift circuits 34 are of the same basic design, the only difference being the sizes of electronic components which are chosen to give each phase shift circuit 34 a specific characteristic.

The outputs $E_{1\,out}$ and $E_{2\,out}$ which are provided at terminals 36, 38 respectively of summing amplifier 30, 32, respectively, have a selected differential phase shift which remains extremely constant over a very broad frequency range. In this example a differential phase shift of 90° has been selected.

Figure 2:
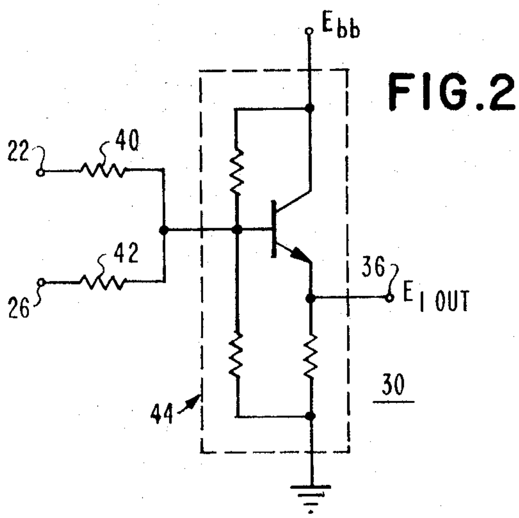
FIG. 2 is a schematic representation of a summing amplifier used in the phase shifter shown in FIG. 1.

One possible arrangement of the summing amplifier 30 is shown in FIG. 2. The summing amplifier 30, which may be identical to summing amplifier 32 comprises summing resistors 40, 42 which have one terminal connected to outputs 22, 26, respectively, and the other terminal connected to the base of an emitter follower 44.

Figure 3:
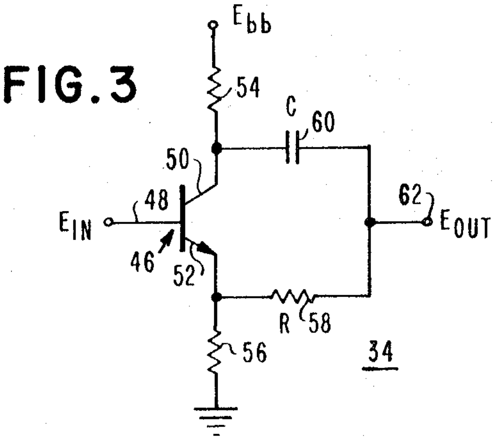
FIG. 3 is a schematic representation of a phase shift circuit used in the phase shifter shown in FIG. 1.

As shown in FIG. 3 a phase shift circuit 34 comprises a transistor 46 having a base 48, a collector 50, and an emitter 52. A direct current source $E_{bb}$ and biasing resistors 54, 56 are connected across the collector 50 and emitter 52 and in parallel with a series connected resistor 58 and capacitor 60. Their common junction provides an output 62 to the next stage.

The phase shift circuit 34 shifts the phase of the output with respect to the input by an amount $\Phi = 2 \arctan 2\pi fRC$ where $\Phi$ is the amount of phase shift, $f$ is the frequency of the input signal, R is the size of the resistor 58 in ohms, and C is the size of the capacitor 60 in farads.

Figure 4:
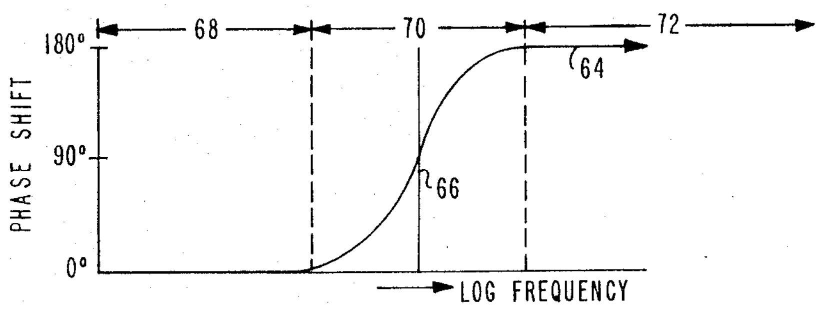
FIG. 4 is a representation of a phase shift produced by the phase shift circuit of FIG. 3.

The curve 64 of FIG. 4 demonstrates in general how the phase shift $\Phi$ varies with the logarithm to the base 10 of the frequency $f$. The frequency 66 at which the phase shift is exactly 90° is referred to as the center frequency. The center frequency can be chosen to be any desired value by properly choosing R and C. For instance, if a center frequency of 500 Hz. is desired, $2\pi(500)RC = 1$, and $RC = 0.3183\times10^{13}$, a resistance of 317 ohms and a capacitance of 1 microfarad will produce a center frequency of 500 Hz.

The curve 64 has three general frequency ranges. There is a low range 68 over which the phase shift is substantially zero, an intermediate frequency range 70 over which the phase shift varies from approximately zero to 180°, and a high frequency range over which the phase shift remains at approximately 180°. By spacing the various center frequencies of the five phase shift circuits of a phase shift network over the broad frequency range, the five intermediate frequency ranges can be spread over the broad frequency range so that as the frequency of the input signal to a phase shift network increases, covering the entire broad frequency range, the input signal is always passing through the intermediate range of one of the five phase shift circuits and the phase shift of the output signal always varies with frequency.

Figure 5:
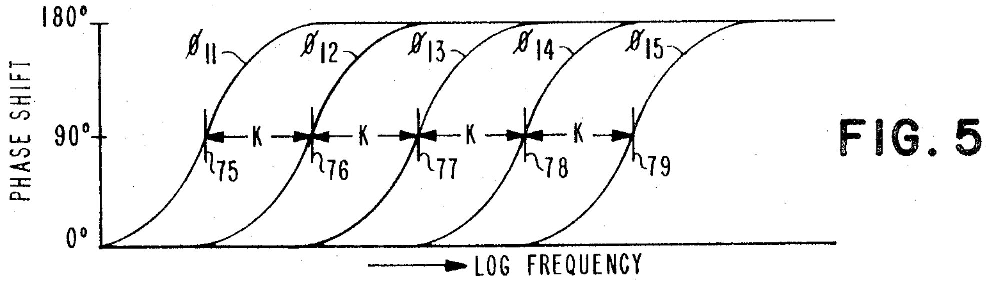
FIG. 5 is a representation of several different phase shift curves produced by several different phase shift circuits of the type shown in FIG. 3.

As shown in FIG. 5 the five phase shift circuits 34 of the phase shift network 12 have center frequencies at 75, 76, 77, 78, 79 and induce phase shifts of $\Phi_{11}$, $\Phi_{12}$, $\Phi_{13}$, $\Phi_{14}$ and $\Phi_{15}$, respectively. The total phase shift $\Phi_{1T}=\Phi_{11}+\Phi_{12}+\Phi_{13}+\Phi_{14}+\Phi_{15}$. Similarly, the total phase shifts $\Phi_{2T}$, $\Phi_{3T}$ and $\Phi_{4T}$ of the phase shift networks 14, 16, 18, respectively, are the sums of the phase shifts of the five phase shift circuits within each phase shift network. The difference between the logarithms of adjacent center frequencies of phase shift circuits within each phase shift network 12, 14, 16, 18 is a constant, K. This means that adjacent center frequencies are separated by a constant multiplicative factor. For instance, the second may be thirty times the first and the third 30 times the second, producing center frequencies of 10 Hz., 300 Hz. and 9K Hz.

Figure 6:
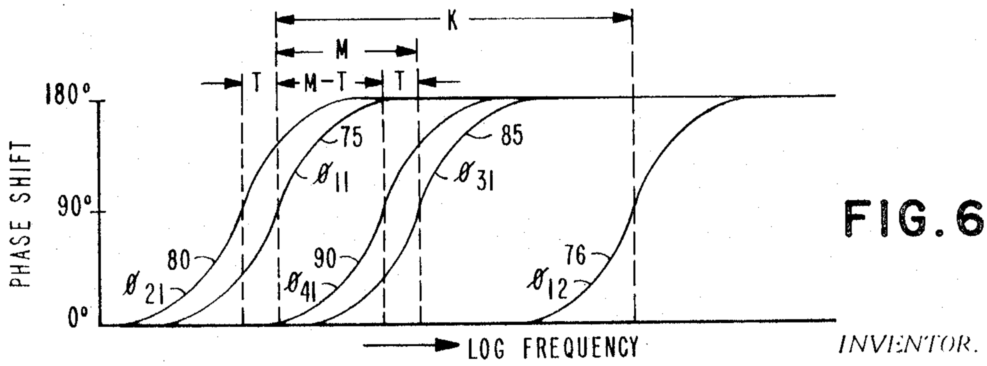
FIG. 6 is a representation of phase shifts produced by various phase shift circuits shown in FIG. 1.

Research has demonstrated that the quality of the differential phase shift response is dependent on the relationships between the center frequencies of corresponding phase shift circuits 34 rather than the center frequencies independently. These relationships are illustrated in FIG. 6. The curves 75, 80, 85, 90 represent corresponding stages of the phase shift networks 12, 14, 16, and 18, respectively, and have phase shifts of $\Phi_{11}$, $\Phi_{21}$, $\Phi_{31}$ and $\Phi_{41}$, respectively. By limiting the following discussion to frequencies near the lowest center frequency, the phase shift circuits having higher center frequencies induce no phase shift and can be ignored. This is done to simplify the following discussion. Thus, the total phase shift in the phase shift networks 12, 14, 16, 18 is represented by the curves 75, 80, 85, 90, respectively.

The logarithm of the center frequency of the curve 80 is separated from the logarithm of the center frequency of curve 75 by a constant, T, T being negative in this example:

The logarithm of the center frequency of the curve 85 is separated from the logarithm of the center frequency of the curve 75 by a constant, M; and the logarithm of the center frequency of the curve 90 is separated from the logarithm of the center frequency of the curve 75 by a constant, M-T. These same relationships are maintained between corresponding center frequencies of the remaining phase shift circuits.

Figure 7:
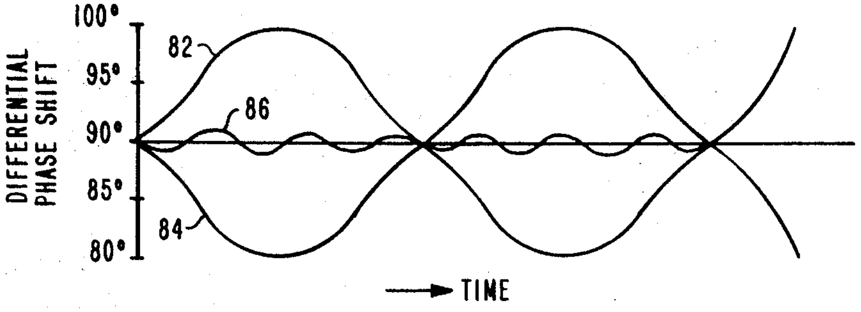
FIG. 7 is a representation of differential phase shifts produced by the phase shifter shown in FIG. 1.

The phase shifter 10 can be thought of as two phase shifters, the first comprising the phase shift networks 12 and 16, and the second comprising the phase shift networks 14 and 18. The differential phase shift of the first phase shifter is represented in FIG. 7 as the curve 82 and the differential phase shift of the second phase shifter is represented by the curve 84. Although the constants are all somewhat interdependent, the constant M largely determines the differential phase shift of these two phase shifters and the constant T determines the phase relationship between the two phase shifters. If the constant T is chosen such that increased differential phase shift occurs in the first phase shifter concurrently with reduced differential phase shift in the second and vice versa as shown in FIG. 7, and if the corresponding outputs 12, 14, and 16, 18 are added as shown in FIG. 1, the output of the phase shifter 10 has a differential phase shift which is very nearly constant over a very broad frequency range as illustrated by the curve 86 in FIG. 7.

Best results were achieved with the arrangement of FIG. 1 by choosing $K = \log 34$, $M = \log 5.84$, and $T = \log 0.168$. The center frequencies of the five phase shift circuits were 10 MHz., 294 KHz., 8.6 KHz., 254 Hz. and 7 Hz. in the phase shift network 12; 1.7 MHz., 50 KHz., 1.48 KHz., 44 Hz. and 1 Hz. in the phase shift network 14; 59.5 MHz., 1.75 MHz., 51.4 KHz., 1.5 KHz., and 45 Hz. in the phase shift network 16; and 10.1 MHz., 299 KHz., 8.8 KHz., 259 Hz. and 8 Hz. in the phase shift network 18. These values produce a differential phase shift of 90°, $$\begin{matrix} +0.3° \\ -1.5° \end{matrix}$$

over a broad frequency range of 40 Hz. to 2 MHz.

Figure 8:
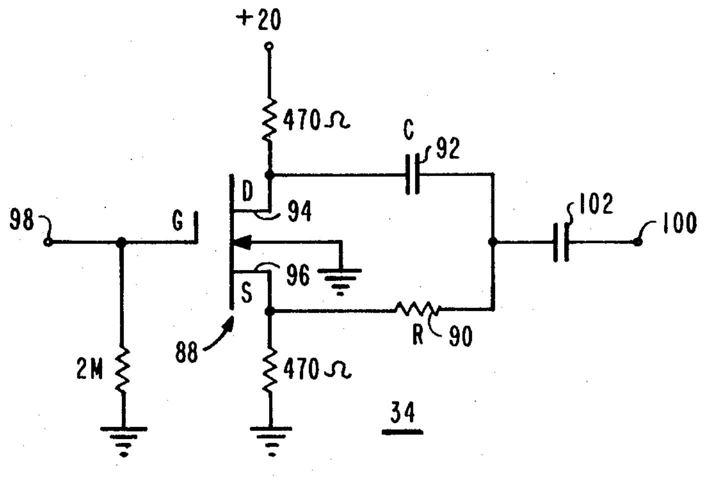
FIG. 8 is a schematic representation of an alternative arrangement of a phase shift circuit used in the phase shifter of FIG. 1.

An alternative arrangement of the basic phase shift circuit 34 is shown in FIG. 8. This phase comprises a suitably biased insulated field effect transistor 88 having a resistor 90 and a capacitor 92 connected in series between the drain 94 and the source 96. The gate 98 provides the input and the output 100 is connected through a coupling capacitor 102. The resulting phase shift curve is substantially the same as large shown in FIG. 4 for phase shift circuits using bipolar transistors.

The use of field effect transistors improves performance by increasing the networks impedance. This arrangement is also more adaptable to large scale integration.

Although there have been described above specific arrangements of a differential phase shifter in accordance with the invention, for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A broadband differential phase shifter having a single input and first and second outputs shifted by a relatively constant selected amount over a broad frequency range comprising:

a plurality of phase shift networks responsive to said single input, each of said phase shift networks including a plurality of series connected phase shift circuits having different center frequencies distributed over the broad frequency range;

summing means responsive to at least one of said phase shift networks providing said first output; and summing means responsive to at least one of said phase shift networks providing said second output.

2. A broadband differential phase shifter having a single input and first and second outputs shifted by a relatively constant selected amount over a broad frequency range comprising:

first, second, third and fourth phase shift networks responsive to said single input, each of said phase shift networks including a plurality of series connected phase shift circuits, each phase shift circuit within a given phase shift network providing phase shift varying with frequency over a different selected portion of said frequency range;

summing means responsive to said first and third phase shift networks providing said first output; and summing means responsive to said second and fourth phase shift networks providing said second output.

3. A broadband differential phase shifter having a single input and first and second outputs, said first and second outputs having a relatively constant phase differential of a selected amount, comprising:

a plurality of phase shift networks connected to said single input, each of said phase shift networks including a plurality of phase shift circuits connected in series, each providing variable phase shift response over a different selected portion of a broad frequency range;

summing means responsive to a first plurality of phase shift networks providing said first output; and summing means responsive to a second plurality of phase shift networks providing said second output.

5. A broadband differential phase shifter having a single input and first and second outputs shifted in phase by a relatively constant selected amount over a broad frequency range comprising:

a first plurality of phase shift networks connected in parallel between said input signal and a first summing amplifier, each of said phase shift networks including a plurality of phase shift circuits connected in series, each of said phase shift circuits having a low frequency range wherein minimal phase shift occurs, an intermediate frequency range wherein phase shift varies with frequency from approximately zero to approximately 180°, and a high frequency range wherein phase shift remains approximately 180°, and each of said phase shift circuits having a different intermediate range selected to place every frequency within said broad frequency range within the intermediate range of at least one phase shift circuit;

a second plurality of phase shift networks connected in parallel between said input signal and a second summing amplifier, each of said phase shift networks including a plurality of phase shift circuits connected in series, each of said phase shift circuits having a low frequency range wherein minimal phase shift occurs, an intermediate frequency range wherein phase shift varies with frequency from approximately zero to approximately 180°, and a high frequency range wherein phase shift remains approximately 180°, and each of said phase shift circuits having a different intermediate range selected to place every frequency within said broad frequency range within the intermediate range of at least one phase shift circuit;

a first summing amplifier summing outputs from the first plurality of phase shift networks to provide said first output; and a second amplifier summing outputs from the second plurality of phase shift networks to provide said second output signal.

6. A broadband differential phase shifter having a single input and first and second outputs shifted in phase by a relatively constant selected amount over a broad frequency range comprising:

a plurality of phase shift networks having inputs connected in parallel to said single input, each of said phase shift networks including a plurality of phase shift circuits connected in series, each of said phase shift circuits within each phase shift network having a low frequency range wherein minimal phase shift occurs, an intermediate frequency range wherein phase shift varies with frequency from approximately zero to approximately 180°, said intermediate frequency range including a center frequency whereat the phase shift is 90°, and a high frequency range wherein phase shift remains approximately 180°, and each of said phase shift circuits within each phase shift network having a selected different center frequency, said center frequencies being selected to provide center frequencies spaced over the broad frequency range with the difference between the logarithms of center frequencies which are adjacent on the frequency range being a constant, K;

a first summing amplifier connected to receive outputs of a first plurality of phase shift networks, the output of the first summing amplifier being said first output; and a second summing amplifier connected to receive outputs of a second plurality of phase shift networks, the output of the second summing amplifier being said second output.

7. A broadband differential phase shifter having a single input and first and second outputs shifted in phase by a relatively constant selected amount over a broad frequency range comprising:

a first plurality of phase shift networks having inputs connected to said single input, each of said phase shift networks including a plurality of phase shift circuits connected in series, each of said phase shift circuits including amplifying means with two output terminals connected together through a resistor and a capacitor in series, the output of the phase shift circuit being the junction of said resistor and capacitor, and each of said phase shift circuits having a selected center frequency whereat a phase shift of 90° is provided, the center frequencies of all phase shift circuits within each phase shift network being selected to provide center frequencies spaced over the broad frequency range with the difference between the logarithms of center frequencies which are adjacent on the broad frequency range being a constant, K; K;

a plurality of phase shift networks having inputs connected to said single input, each of said phase shift networks including a plurality of phase shift circuits connected in series, each of said phase shift circuits including amplifying means with two output terminals connected together through a resistor and a capacitor in series, the output of the phase shift circuit being the junction of said resistor and capacitor, and each of said phase shift circuits having a selected center frequency whereat a phase shift of 90° is provided, the center frequencies of all phase shift circuits within each phase shift network being selected to provide center frequencies spaced over the broad frequency range with the difference between the logarithms of center frequencies which are adjacent on the broad frequency range being a constant, K;

a first summing amplifier having inputs responsive to said first plurality of phase shift networks and providing said first output; and a second summing amplifier having inputs responsive to said second plurality of phase shift networks and providing said second output.

4. A broadband differential phase shifter having a single input and first and second outputs shifted by a relatively constant amount over a broad frequency range comprising:

a first phase shift network providing said first output responsive to said single input and including a plurality of series connected phase shift circuits having center frequencies distributed over said broad frequency range; and a second phase shift network providing said second output responsive to said single input and including a plurality of series connected phase shift circuits having center frequencies distributed over said broad frequency range.

8. A broadband differential phase shifter having a single input and first and second outputs shifted in phase by a relatively constant selected amount over a broad frequency range comprising:

first, second, third and fourth phase shift networks responsive to said single input, each of said phase shift networks including first, second, third, fourth and fifth corresponding phase shift circuits connected in series, each of said phase shift circuits including a transistor having a base for an input, direct current biasing means connected between a collector and an emitter, and a resistance, R, and a capacitance, C, connected in series, said resistance and capacitance being connected between the collector and emitter in parallel with the direct current biasing means, the output of each phase shifting circuit being the common junction of said resistance and capacitance, each of said phase shift circuits producing a phase shift, $\Phi$, varying with frequency, $f$, according to the equation $\Phi = 2 \arctan 2\pi f RC$, and each of said phase shift circuits having a selected center frequency whereat a phase shift of 90° is provided, said center frequencies being selected to provide each phase shift network with center frequencies spaced over the broad frequency range with the difference between the logarithms of center frequencies which are adjacent on the broad frequency range being a constant, K; said center frequencies being further selected to maintain the difference between the logarithms of corresponding center frequencies in the first and second networks a constant, M; said center frequencies being further selected to maintain the difference between the logarithms of corresponding center frequencies in the first and third networks a constant, T; and said center frequencies being further selected to maintain the difference between the logarithm of corresponding center frequencies in the first and fourth networks a constant, M-T;

summing means responsive to said first and third phase shift networks providing said first output; and summing means responsive to said second and fourth phase shift networks providing said second output.

9. The differential phase shifter of claim 8 wherein said first and second outputs are shifted in phase by 90°, $K = \log 34$, $M = \log 5.84$, and $T = \log 0.168$, and the center frequencies of the first through fifth circuits of the first network are respectively 10 MHz., 29 KHz., 8.6 KHz., 254 Hz. and 7 Hz.

10. The differential phase shifter of claim 9 wherein field effect transistors are used in the phase shift circuits.

PO-1050
(5/69)

UNITED STATES PATENT OFFICE
CERTIFICATE OF CORRECTION

Patent No. 3,612,916 Dated October 12, 1971

Inventor(s) Daniel R. O'Neill

It is certified that error appears in the above-identified patent and that said Letters Patent are hereby corrected as shown below:

Column 2, line 15, "difference" should read --differences--; line 46, "RC = 0.3183 x $10^{13}$" should read --RC = 0.3183 x $10^{-3}$--. Column 3, line 20, the colon (":") should be a semicolon (--;--); line 63, "phase" should read --arrangement--; line 68, "large" should read --that--; line 71, "networks" should read --input--. Column 4, line 48, claim "5" should be claim --4--. Column 5, line 7, after "second" and before "amplifier" insert --summing--; line 10, claim "6" should read claim --5--; line 38, claim "7" should read claim --6--; line 58, delete "K;" (second occurrence). Column 6, line 11, claim "4" should read claim --7--.

Signed and sealed this 12th day of September 1972.

(SEAL)
Attest:

EDWARD M.FLETCHER,JR.
Attesting Officer

ROBERT GOTTSCHALK
Commissioner of Patents